United States Patent [19]

Pulse

[11] Patent Number: 5,618,123
[45] Date of Patent: Apr. 8, 1997

[54] COUPLING DEVICE FOR SEWER AND DRAIN CLEANING CABLE

[75] Inventor: Robert Pulse, Davenport, Iowa

[73] Assignee: Pettibone Corporation, Lisle, Ill.

[21] Appl. No.: 514,042

[22] Filed: Aug. 11, 1995

[51] Int. Cl.$^6$ ........................................... F16D 9/00
[52] U.S. Cl. ................ 403/2; 403/301; 464/32; 15/104.33
[58] Field of Search ........................ 403/2, 11–12, 403/41, 292, 294, 300, 301, 306; 464/32; 15/104.33

[56] References Cited

U.S. PATENT DOCUMENTS

| | | | |
|---|---|---|---|
| 881,075 | 3/1908 | Hosking | 464/32 X |
| 2,094,682 | 10/1937 | Shaffer | 464/32 X |
| 2,169,543 | 8/1939 | Sullivan | 15/104.33 X |
| 2,189,452 | 2/1940 | Stone | 15/104.33 X |
| 2,464,477 | 3/1949 | Aasland . | |
| 2,557,119 | 6/1951 | Kjerulff | 15/104.33 X |
| 2,575,475 | 11/1951 | Stutzke . | |
| 2,753,029 | 7/1956 | Babaian . | |
| 2,940,099 | 6/1960 | Kollman . | |
| 2,962,880 | 12/1960 | May . | |
| 3,186,745 | 6/1965 | Lyles | 403/2 |
| 3,224,024 | 12/1965 | Hunt . | |
| 3,574,878 | 4/1971 | Ardsley et al. . | |
| 3,742,548 | 7/1973 | Ciaccio . | |
| 3,882,565 | 5/1975 | Irwin et al. . | |
| 4,042,305 | 8/1977 | Vincent | 15/104.33 X |
| 4,064,953 | 12/1977 | Collins | 464/32 X |
| 4,067,248 | 1/1978 | LaVagetto . | |
| 4,104,757 | 8/1978 | Silverman . | |
| 4,185,477 | 1/1980 | van der Lely et al. . | |
| 4,186,570 | 2/1980 | Pokrandt . | |
| 4,330,926 | 5/1982 | McCall | 403/2 X |
| 4,364,139 | 12/1982 | Babb et al. . | |
| 4,364,140 | 12/1982 | Irwin | 15/104.33 |
| 4,389,202 | 6/1983 | Hochreuter . | |
| 4,653,623 | 5/1987 | Demorest . | |
| 4,802,783 | 2/1989 | Erickson | 403/2 |
| 4,894,043 | 1/1990 | Nixon, Jr. . | |
| 5,199,129 | 4/1993 | Salecker . | |

*Primary Examiner*—Harry C. Kim
*Attorney, Agent, or Firm*—McDermott, Will & Emery

[57] ABSTRACT

The coupling device for coupling a cable of a sewer and drain cleaning machine to a cutting tool comprises a housing, a cable connecting mechanism for connecting the cable to the housing, a cutting tool connecting mechanism for rotatably connecting the cutting tool to the housing, and a breakable drive mechanism for driving the cutting tool when the cable and the housing are rotated and breaking when a predetermined amount of torque is applied between the housing and the cutting tool, the predetermined amount of torque being less than the amount of torque needed to break the cable.

15 Claims, 3 Drawing Sheets

COUPLING DEVICE FOR SEWER AND DRAIN CLEANING CABLE

BACKGROUND OF THE INVENTION

1. Field of the Invention

This invention relates generally to sewer and drain cleaning machines and, more particularly, to a coupling device for coupling a cable of a sewer and drain cleaning machine to a cutting tool which is mounted at a distal end of the cable.

2. Background Art

Power driven cables or "snakes" for cleaning out clogged drains or sewer pipes are well known. Generally, an elongated, flexible sewer cable formed of one or more of the helical wires is inserted into a drain pipe to be cleaned and, at the same time, the cable is rotated. A sewer or drain cleaning tool is attached to a distal end of the cable in order to cut away or clear a clogged portion of the drain pipe. A number of different types of cleaning tools can be used depending on the type of obstruction encountered.

A common problem which occurs when using power driven cable is breaking or kinking of the sewer cable due to excessive torque being applied to the cable by the motor drive when the tool encounters an obstruction which severely limits or stops the rotational movement of the tool. In such a situation, severe torque is applied to the cable because the cleaning tool is not rotating at all. The excessive torque causes the cable to permanently kink or break. Should the cable break the expensive cleaning tool is difficult, if not impossible, to retrieve from the sewer or drain pipe. If the cable permanently kinks, it is no longer usable.

Attempts have been made to address this problem by providing a slip clutch at the power-driven end of the sewer snake as shown in U.S. Pat. Nos. 3,742,548 and 3,574,878. The use of slip clutches as described in these patents do not respond directly to the torque at the distal end of the cable which is where torque build up causes kinking or breaking of the cable due to the tool encountering a blockage.

These clutches are mounted adjacent to the motor drive so that they are easily accessible to the operator and may be periodically adjusted to change the torque setting at which they will begin to slip. When a large length of the sewer cable is fed into the sewer or drain pipe, the total weight of the sewer cable to be turned increases and accordingly, more torque must be generated to rotate the sewer cable within the drain pipe. Additionally, as the sewer cable is fed into the drain pipe it encounters many minor obstructions such as bends or turns in the sewer pipe itself which apply additional resistance to rotation of the sewer cable which then demands additional torque to be applied to the driven end of the cable to keep the cable rotating within the drainpipe.

By the time the torque setting has been adjusted to account for the weight of the cable, the setting is so high that the cable will kink or break if the distal end of the cable encounters an obstruction which prevents the tool from rotating.

In U.S. Pat. No. 4,104,754 an overload slip or escapement clutch is positioned between the sewer cleaning head and the adjacent free or distal end of the cable. The slip clutch is spring loaded and gives off a vibrational click when slippage is occurring within the clutch. The vibration provides feedback to the operator that a blockage has been encountered. Such complex slip clutches are known to wear, are unreliable and may provide excessive torque if improperly adjusted.

The present invention is designed to eliminate the above disadvantages of prior art devices and to provide a simple coupling device which is reliable in preventing breakage or kinking of the sewer cable, is easily reset and is inexpensive.

SUMMARY OF THE INVENTION

It is a primary object of the invention to provide a coupling device for coupling a cable of a sewer and drain cleaning machine to a cutting tool that prevents breaking or kinking of the cable.

The device comprises a housing, a cable connecting mechanism for connecting the cable to the housing, a cutting tool connecting mechanism for rotatably connecting the cutting tool to the housing, and a breakable drive mechanism for driving the cutting tool when the cable and the housing are rotated and breaking when a predetermined amount of torque is applied between the housing and the cutting tool. The predetermined amount of torque needed to cause the drive mechanism to break is less than the amount of torque needed to break the cable.

It is another object of the present invention to provide a coupling device between the distal end of the cable and the cutting tool that is reliable and accurately controls the amount of torque built up at the distal end of the cable.

A further object of the present invention is to provide a coupling device that is easily reset after the breakable drive mechanism breaks.

It is still a further object of the present invention to provide a coupling device that is easily adapted to existing cables and tools and is inexpensive.

DESCRIPTION OF THE PREFERRED EMBODIMENT(S)

Figure 1:
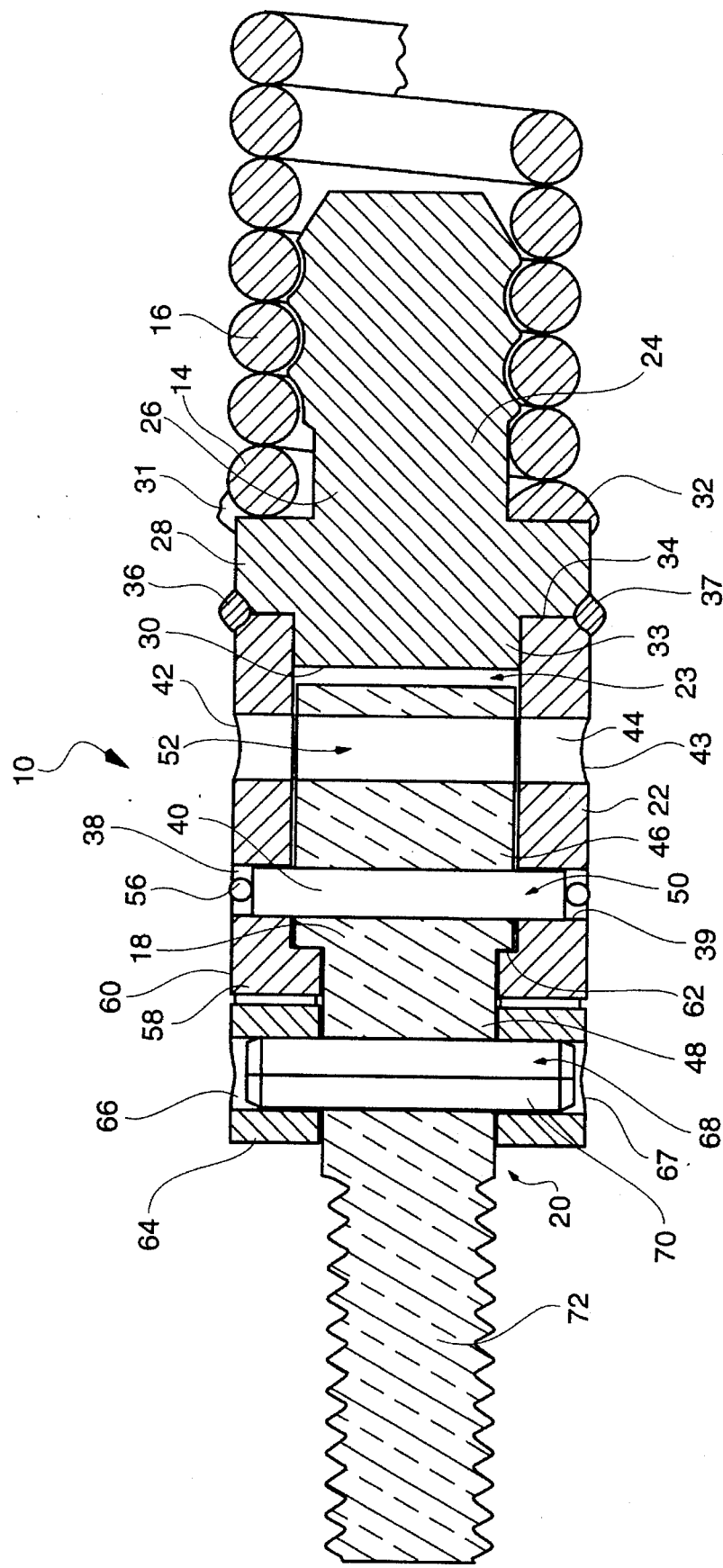
FIG. 1 is a cross sectional side view of a device for coupling a cable of a sewer or drain cleaning machine to a cutting tool.

Referring now to FIG. 1, a sewer or drain cleaning cable coupling device 10 is shown coupling a distal end 14 of a coiled cable 16 or "snake" to a proximal end 18 of a cutting tool shaft 20. In use, a cutting tool, such as a cutter blade, is attached to the cutting tool shaft 20 and the cable 16 is driven or rotated by a motor at a proximal end of the cable 16.

The coupling device 10 includes a tubular housing 22, having an axial passageway 23, and a cylindrical mounting portion 24. The cylindrical mounting portion 24 has a circular outer surface 26 and an annular flange 28 on the outer surface 26 near a distal end 30 of the cylindrical mounting portion 24. The distal end 14 of the cable 16 is attached to the cylindrical mounting portion 24 of the device 10. As shown in FIG. 1, the distal end 14 of the cable 16 is threaded on to the cylindrical mounting portion 24 and the distal end 14 of the cable 16 abuts the annular flange 28. The cable 16 can also be welded to the annular flange 28 at welds 31, 32, to reinforce the connection of the cable 16 to the cylindrical mounting portion 24.

The distal end 30 of the cylindrical mounting portion 24 is positioned within the axial passageway 23 of the tubular housing 22. A proximal end 34 of the housing 22 abuts the annular flange 28 of the cylindrical mounting portion 24. The housing 22 is connected to the cylindrical mounting portion 24 by welding the housing 22 to the annular flange 28 as shown at welds 36, 37.

The tubular housing 22 has a first set of diametrically opposed holes 38, 39, i.e. shear pin holes, therein for receiving a shear pin 40 and a second set of diametrically opposed holes 42, 43 therein, i.e., location holes, for receiving a slip pin 44. A proximal portion 46 of the cutting tool shaft 20 is positioned within the axial passageway 23 of the tubular housing 22. An intermediate portion 48 of the cutting tool shaft 20 extends distally from the proximal portion 46 and out of the tubular housing 22. The proximal portion 46 of the cutting tool shaft 20 is generally circular in cross-section and has a larger cross-sectional diameter than the intermediate portion 48. The proximal portion 46 also has a radial passage 50 for receiving the shear pin 40 and a radial passage 52 for receiving the slip pin 44. When the proximal portion 46 of the cutting tool shaft 20 is positioned within the tubular housing 22 of the device 10, the two passages 50, 52 can be aligned with the two sets of holes 38, 39 and 42, 43, respectively, in the tubular housing 22 of the device 10.

When the passages 50, 52 are aligned with the holes 38, 39 and 42, 43, the shear pin 40 is placed through one of the shear pin holes 38 or 39 and into the passage 50 to couple the cutting tool shaft 20 to the tubular housing 22 and prevent relative rotation between them. A retaining ring 56 is placed around the tubular housing 22 and over the shear pin holes 38, 39 to retain the shear pin 40 inside the shaft 20. Note that without the shear pin 40 in place, the shaft 20 can freely rotate within the tubular housing 22 of the device 10. With the pin 40 inserted into the shaft 20, the shaft 20 and the tubular housing 22 rotate together.

The tubular housing 22 has an inwardly extending circular flange 58 at a distal end 60 thereof. The inwardly extending flange 58 engages an abutment surface 62 of the proximal portion 46 of the shaft 20 and prevents the shaft 20 from becoming detached from the tubular housing 22.

A hexagon blade driver 64 is mounted on the intermediate portion 48 of the shaft 20 and has two diametrically opposed dowel rod holes 66, 67 therein. The intermediate portion 48 of the shaft 20 has a passage 68 therein which can be aligned with the dowel rod holes 66, 67 in the blade driver 64. A dowel rod 70 is inserted through the holes 66, 67 and into the passage 68 and thereby secures the hexagon blade driver 64 to the shaft 20. A distal, threaded portion 72 of the shaft 20 is adjacent to the intermediate portion 48 of the shaft 20. A tool such as a cutter blade can be mounted to the shaft 20 by threading the tool on to the threaded portion 72. As the tool is threaded onto the shaft 20, the hexagon blade driver 64 should be held with a wrench to prevent torque from being applied to the shear pin 40.

A motor at the proximal end of the cable 16 rotates the cable 16, which drives the cylindrical mounting portion 24 of the device 10, which in turn drives the tubular housing 22. The tubular housing 22 drives the shaft 20 via the shear pin 40. As the cable 16 is advanced into a sewer or drain, the cutter blade will often encounter a blockage. When the blade encounters a blockage, torque is created on the blade. The torque is transmitted from the blade, back through the shaft 20 and through the shear pin 40 to the tubular housing 22 of the coupling device 10, the cylindrical mounting portion 24 of the device 10 and back to the cable 16. When torque is created, shear stress is created in the shear pin 40. To prevent the cable 16 from breaking or kinking due to excessive torque, the shear pin 40 is designed to break when a predetermined amount of torque is created. The predetermined amount of torque is less than the amount of torque needed to cause kinking or breaking of the cable 16. Note that the shear pin 40 breaks at the point between the shaft 20 and the tubular housing 22.

Various pins having different size diameters or made of different materials can be used to vary the predetermined amount of torque that will cause the pin 40 to break due to shear stress. The pin 40 can be made of materials such as plastic, aluminum or brass, which have different tolerances to shearing. Also, the diameter of the pins can be varied to allow the pin to withstand more or less shear stress.

After the shear pin 40 breaks, the tubular housing 22 of the assembly will simply spin around the shaft 20 and will no longer turn the tool. An operator can pull the cable 16 and the expensive tool out of the sewer or drain. The operator then can replace the broken shear pin 40 and continue clearing the sewer or drain.

The broken shear pin 40 is replaced by first aligning the location holes 42, 43 in the tubular housing 22 of the device 10 with the location passage 52 in the shaft 20. When the holes 42, 43 and the passage 52 are aligned, a slip pin (not shown) is placed through the holes 42, 43 and into the passage 52 in order to prevent rotation of the shaft 20 with respect to the tubular housing 22 and to align the shear pin holes 38, 39 with the passage 50. Then, the retaining ring 56 is moved away from the shear pin holes 38, 39 and the broken shear pin 40 can be easily removed from the passage 50. A new shear pin 40 can be placed into the passage 50 and the retaining ring 56 can be replaced over the shear pin holes 38, 39 to keep the new shear pin 40 in place and finally the slip pin can be removed.

Figure 2:
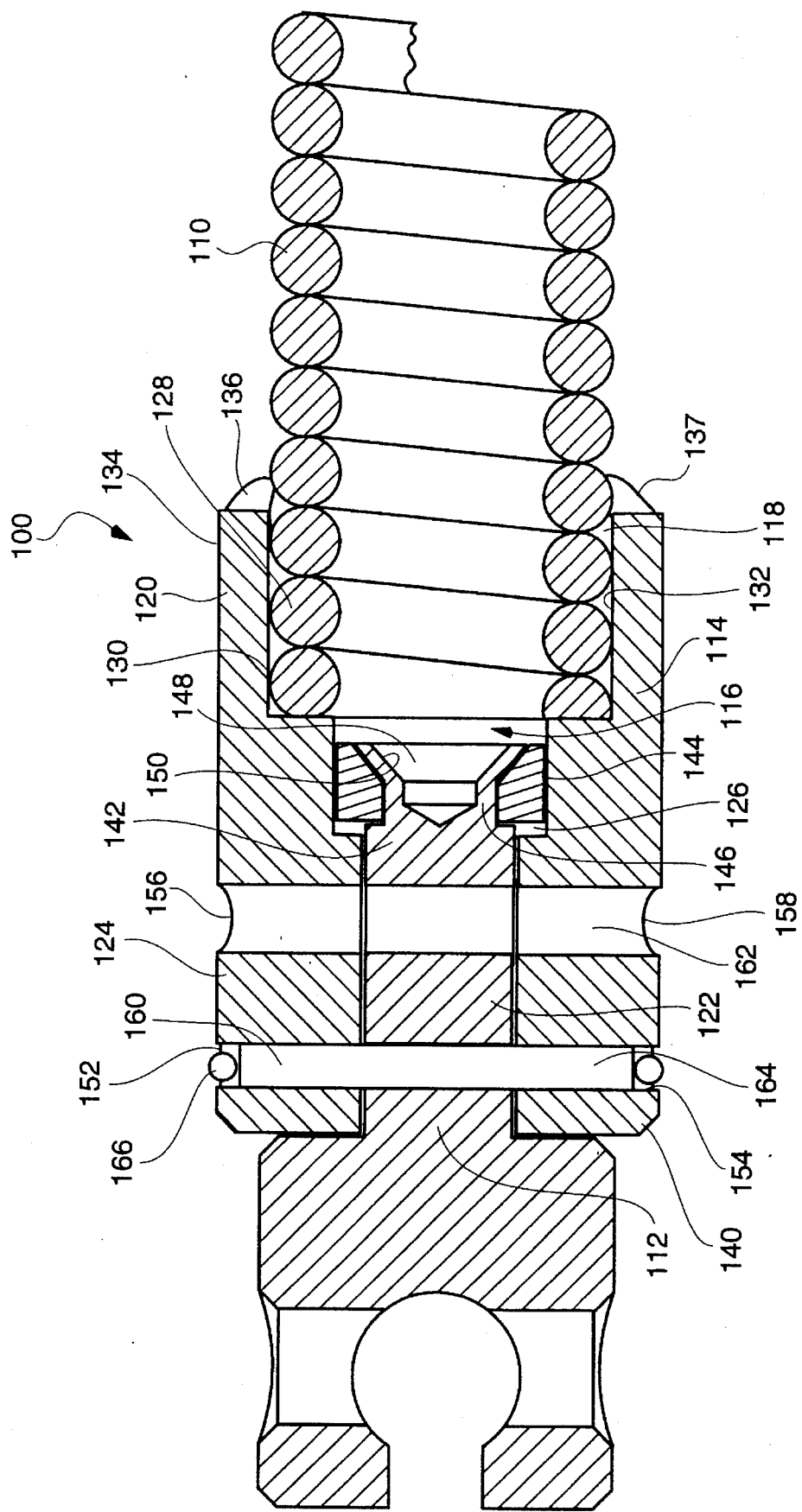
FIG. 2 is a cross sectional side view of a second embodiment of a device for coupling a cable of a sewer or drain cleaning machine to a cutting tool.

Referring now to FIG. 2, a cable coupling device 100 for coupling a cable 110 to a cutting tool mounting shaft 112 is shown. The cable coupling device 100 includes a tubular housing 114 having an axial passageway 116 therein. The axial passageway 116 has a first portion 118 in a proximal portion 120 of the tubular housing 114, a second portion 122 in a distal portion 124 of the tubular housing 114 and a third portion 126 between the first portion 118 and the second portion 122. Note that the first portion 118 of passage is larger in cross-sectional diameter than the third portion 126, which is larger in cross-sectional diameter than the second portion 122.

A distal portion 128 of the cable 110 is received within the first portion 118 of the axial passage 116 and a distal end 130 of the cable 110 abuts a circular wall 132 within the passage 116. The cable 110 is welded to the tubular housing 114 at a proximal end 134 of the tubular housing 114 as shown at welds 136, 137.

A proximal portion 142 of the cutting tool mounting shaft 112 is inserted into a distal end 140 of the tubular housing 114 and extends through the second portion 122 of the axial passage 116 and into the third portion 126 of the axial passage 116.

A washer 144 is placed around a proximal end 146 of the shaft 112 and is secured to the shaft 112 by a stake 148 which is inserted into a beveled inner edge 150 of the proximal end 146 of the shaft 112. Alternatively, the proximal end 146 of the shaft 112 can be secured to the washer 144 by welding the proximal end 146 to the washer 144. Note that with either method of securing the shaft 112 to the washer 144, the shaft 112 cannot be removed from the housing 114 and the shaft 112 and the washer 144 can rotate freely within the housing 114.

The tubular housing 114 has a first set of holes 152, 154 therein, i.e., shear pin holes, and a second set of holes 156, 158 therein, i.e., alignment holes. The proximal portion 142 of the shaft 112 has two radial passageways 160, 162 therethrough, the first passage 100 is a shear pin passage and the second passage 162 is an alignment passage. As described above with respect to the embodiment shown in FIG. 1, the two passages 160, 162 can be aligned with the two sets of holes 152, 154 and 156, 158 in the tubular housing 114. When the passages 160, 162 are aligned with the holes 152, 154 and 156, 158, a shear pin 164 is placed through one of the shear pin holes 152 or 154 and into the shear pin passage 160 to couple the mounting shaft 112 to the tubular housing 114. A retaining ring 166 is placed around the tubular housing 114 and over the shear pin holes 152, 154 to retain the shear pin 164 inside the shaft 112 and housing 114.

Again, as described above, a motor at the proximal end of the cable 110 rotates the cable 110 and the cable 110 drives the tubular housing 114 of the coupling device 100. The tubular housing 114 of the coupling device 100 drives the shaft 112 via the shear pin 164. As the cable 110 is advanced into a sewer or drain, it will often encounter a blockage. When the blade encounters a blockage, torque is created on the mounting shaft 112 and the torque is transmitted back through the shear pin 164, to the tubular housing 114 and back to the cable 110. To prevent the cable 110 from breaking or kinking due to excess torque, the shear pin 164 is designed to break before the cable 110 breaks, as described above with reference to FIG. 1.

After the shear pin 164 breaks, the tubular housing 114 will simply spin around the proximal portion 142 of shaft 112 and will no longer drive the shaft 112. An operator can pull the cable 110 and the expensive cutter blade attached to the shaft 112, out of the sewer or drain. The operator then can replace the broken shear pin 164 and continue clearing the sewer or drain.

The broken shear pin 164 is replaced by first aligning the alignment holes 156, 158 in the tubular housing 114 with the alignment passage 162 in the cutting tool mounting shaft 112. When the holes 156, 158 and passage 162 are aligned, a slip pin (not shown) is placed through the holes 156, 158 and into the passage 162 in order to hold the tubular housing 114 and the mounting shaft 112 in position. Then, the retaining ring 166 is moved away from the shear pin holes 152, 154 and the broken shear pin 164 can be easily removed from the passage 160. A new shear pin 164 can be placed into the passage 160 and the retaining ring 166 can be placed over the shear pin holes 152,154 to keep the new shear pin 164 in place.

Figure 3:
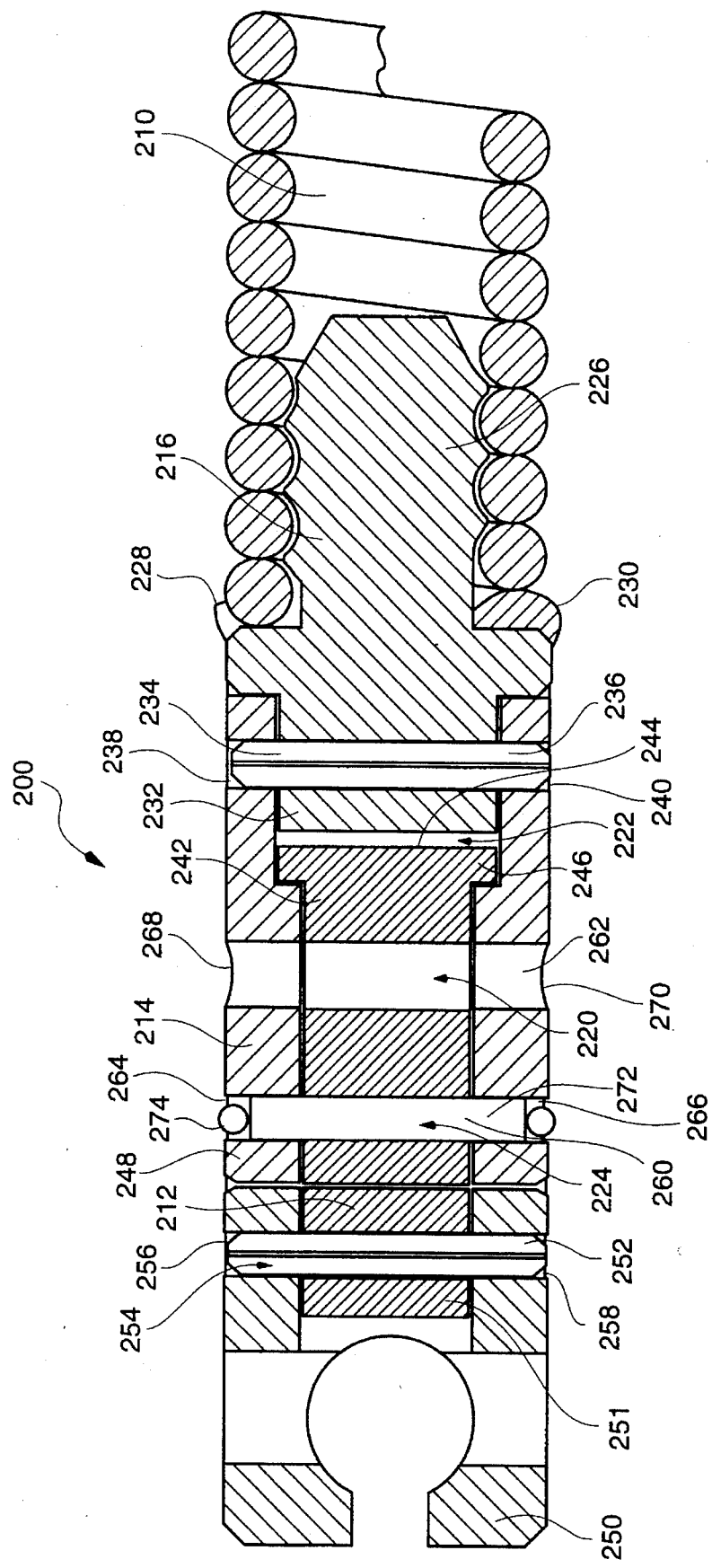
FIG. 3 is a cross sectional side view of a third embodiment of a device for coupling a cable of a sewer or drain cleaning machine to a cutting tool.

Referring now to FIG. 3, a third embodiment of a cable coupling device 200 for coupling a cable 210 to a cutting tool mounting shaft 212 is shown. The cable coupling device 200 includes a tubular housing 214 and a cylindrical cable coupling member 216. The tubular housing 214 has an axial passage 220 therethrough having a first portion 222 and a second portion 224. Note that the first portion 222 has a larger cross-sectional diameter than the second portion 224.

The cylindrical cable coupling member 216 is similar to the cylindrical member described above with respect to FIG. 1. The cable 210 is threaded onto a proximal portion 226 of the cable coupling member 216 and secured thereto at welds 228, 230. A distal portion 232 of the cable coupling member 216 is positioned within the first portion 222 of the axial passage 220 of the tubular housing 214 and secured to the tubular housing 214 by a roll or dowel pin 234 which passes through a radial passage 236 in the cable coupling member 216 and through holes 238, 240 in the tubular housing 214.

A proximal portion 242 of the shaft 212 is received within the second portion 224 of the axial passage 220 and a proximal end 244 of the shaft 212 is positioned within the first portion 222 of the passage 220. The proximal end 244 of the shaft 212 has a circular flange 246 thereon which prevents the shaft 212 from being removed from a distal end 248 of the housing 214. A cutting tool assembly 250 is shown attached to a distal end 251 of the shaft 212 by a dowel pin 252 which passes through a radial passage 254 in the shaft 212 and holes 256, 258 in the cutting tool assembly 250.

The shaft 212 has two axial passages 260, 262 therein, the first axial passage 260 being a shear pin passage and the second axial passage 262 being an alignment passage. As described above with respect to FIGS. 1 and 2, the two passages 260, 262 can be aligned with two sets of holes 264,266 and 268,270 in the tubular housing 214. When the passages 260,262 are aligned with the holes 264,266 and 268,270, a shear pin 272 is placed through one of the shear pin holes 264 or 266 and into the shear pin passage 260 to couple the shaft 212 to the tubular housing 214. A retaining ring 274 is placed around the tubular housing 214 and over the shear pin holes 264, 266 to retain the shear pin 272 inside the shaft 218.

A motor, and as described above with reference to FIGS. 1 and 2, at the proximal end of the cable 210 rotates the cable 210 and, as the cable 210 rotates, the cable 210 drives the cylindrical cable coupling member 216, which in turn drives the tubular housing 214, the cutting tool mounting shaft 212 and the cutting tool assembly 250 via the dowel pin 252. As the cable 210 is advanced into a sewer or drain, it often will encounter a blockage. When the tool, which is mounted to the cutting tool assembly 250, encounters a blockage, torque is created on the tool and is transmitted through the shear pin 272, and, via the various components, back to the cable 210. To prevent the cable 210 from breaking due to excess torque, the shear pin 272 is designed to break before the cable 210 breaks or kinks.

After the shear pin 272 breaks, the tubular housing 214 will simply spin around the shaft 212 and will not drive the shaft 212. An operator can then pull the cable 210 and the expensive cutting tool out of the sewer or drain, replace the broken shear pin 272 and then continue clearing the sewer or drain. The broken shear pin 272 is replaced as described above with respect to FIGS. 1 and 2.

From the foregoing description, it will be apparent that the coupling device 10, 100, 200 of the present invention has a number of advantages, some of which have been described above and others of which are inherent in the coupling device 10, 100, 200 of the present invention. Also, it will be understood that modifications can be made to the coupling device 10, 100, 200 of the present invention without departing from the teachings of the invention. Accordingly the scope of the invention is only to be limited as necessitated by the accompanying claims.

I claim:

1. A coupling device for coupling a cable of a sewer and drain cleaning machine to a cutting tool, said device comprising:

a housing;

cable connecting means for connecting the cable to said housing;

cutting tool connecting means for rotatably connecting the cutting tool to said housing; and breakable drive means for driving the cutting tool when the cable and said housing are rotated and breaking when a predetermined amount of torque is applied between said housing and said cutting tool, said predetermined amount of torque being less than the amount of torque needed to break the cable.

2. The device of claim 1 wherein said housing is tubular and has at least one hole therein and wherein said cutting tool connecting means includes a shaft having a radial passage therein and said breakable drive means includes a shear pin which can be inserted through said hole in said housing and into said radial passage in said cutting tool connecting means.

3. The coupling device of claim 2 wherein said shear pin is made of plastic.

4. The coupling device of claim 2 wherein said shear pin is made of aluminum.

5. The coupling device of claim 2 wherein said shear pin is made of brass.

6. The device of claim 2 further including shear pin retaining means for retaining said shear pin within said radial passage.

7. The device of claim 6 wherein said shear pin retaining means includes a retaining ring placed around said housing and said shear pin hole in said housing.

8. The device of claim 2 wherein said housing has a second hole therein and said shaft has a second radial passage therein which can be aligned with said second hole, wherein when said second hole and said second passage are aligned, said shear pin can be inserted in to or removed from said first passage.

9. The device of claim 8 further including a slip pin which can be inserted into said second hole and said second radial passage to prevent relative rotation between said housing and said shaft.

10. A coupling device for coupling a cable of a sewer and drain cleaning machine to a cutting tool, said device comprising:

a housing having a passage therein;

connecting means for connecting said housing to the cable;

rotatable coupling means, mounted within said passage in said housing, for rotatably coupling the cutting tool to said housing, said rotatable coupling means being rotatable relative to said housing; and breakable coupling and drive means for coupling said rotatable coupling means to said housing to prevent relative rotation between said rotatable coupling means and driving said cutting tool when said housing is rotated, whereby said breakable coupling and drive means breaks when a predetermined amount of torque is applied between said housing and said rotatable coupling means, said predetermined amount of torque being less than the amount of torque needed to break the cable, and whereby when said breakable coupling and drive means is broken, said housing freely rotates around said rotatable coupling means.

11. The coupling device of claim 10 wherein said passage in said housing has a first portion having a first cross sectional area and a second portion having a second cross sectional area, said first cross sectional area being larger than said second cross sectional area; and said rotatable coupling means includes a cylindrical shaft which is at least partially placed within said first portion of said passage and means for securing said shaft within said first portion of said passage.

12. The coupling device of claim 10 wherein said passage in said housing has a first portion having a first cross sectional area and a second portion having a second cross sectional area, said first cross sectional area being larger than said second cross sectional area; and said rotatable coupling means includes a cylindrical shaft having an end portion defined by a flange; and, said flange being positioned within said first portion of said passage.

13. The coupling device of claim 12 wherein said housing has a hole therein and said cylindrical shaft of said rotatable coupling means has a radial passage therein, and, said breakable coupling and drive means includes a shear pin that can be positioned within said cylindrical shaft of said rotatable coupling means.

14. The device of claim 13 further including means for retaining said shear pin within said radial passage.

15. The device of claim 14 wherein said means for retaining said shear pin within said radial passage is an O-ring covering said hole in said housing.

* * * * *